April 19, 1960     R. G. NORELIUS     2,933,609
RADIOACTIVITY WELL SURVEYING
Filed May 11, 1954
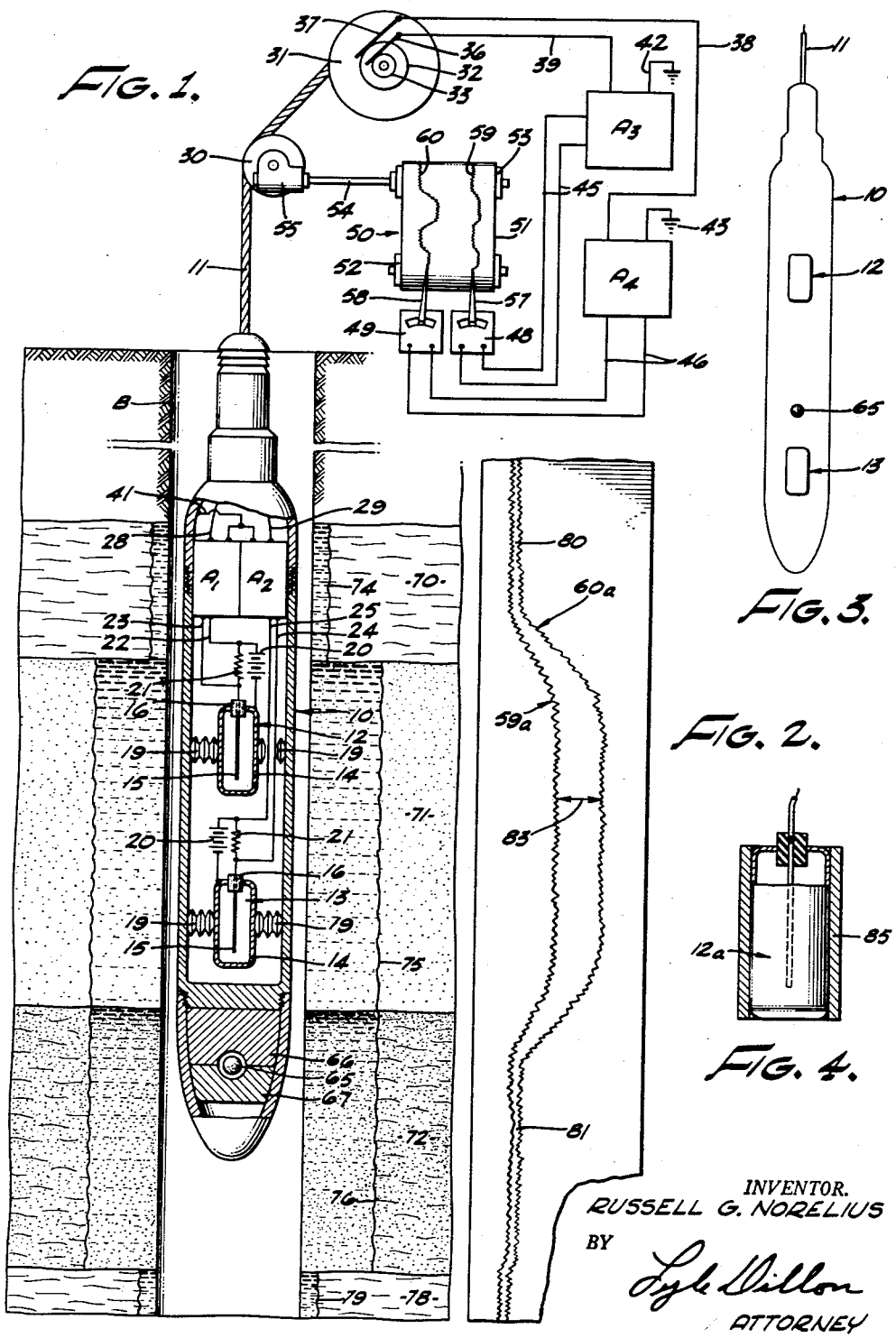
INVENTOR.
RUSSELL G. NORELIUS
BY
Lyle Dillon
ATTORNEY United States Patent Office 2,933,609
Patented Apr. 19, 1960

2,933,609

RADIOACTIVITY WELL SURVEYING

Russell G. Norelius, Caracas, Venezuela, assignor, by mesne assignments, to Dresser Industries, Inc., Dallas, Tex., a corporation of Delaware Application May 11, 1954, Serial No. 429,025

3 Claims. (Cl. 250—83.6)

This invention relates in general to radioactivity logging of earth boreholes and more particularly to radiological methods and apparatus for determining the nature of the fluid contents of subsurface formations penetrated by earth boreholes.

Radiological systems of various kinds have heretofore been employed with considerable success for investigation or logging of earth boreholes for the purpose of identifying or at least distinguishing between or determining the relative positions of interfaces between different earth strata traversed by such boreholes. Attempts have been made, but with only limited success, to determine, by radiological methods, the character of the fluid contents of such formations.

Principal among such radiological methods has been the irradiation or bombardment of the formations in question, with neutrons from a source of fast neutrons lowered through the borehole, and the measuring of the effect on the resultant neutron field in the various formations and the fluid contents thereof, by means of suitable radiation measurement means such as ionization chambers, Geiger-Muller counters or the like devices, sensitive and responsive to secondary gamma rays produced in such formations or responsive to scattered neutrons from such source. Since fast neutrons penetrate all heavy substances with comparative ease but are slowed in velocity most effectively by light elements of which hydrogen is the most effective, a falling off of the scattered neutron field resulting from the source bombardment and reaching the measurement means, or the falling off of the intensity of the resultant secondary gamma rays has been accepted as indicative of the presence of a high hydrogen content liquid such as water or oil in a porous stratum. Conversely, the presence of gas in a porous stratum, which has relatively little hydrogen as compared to oil or water results in an increase of the scattered slow neutron field and secondary gamma rays resulting from such neutron field in the vicinity of the measurement means, and hence an increase in the slow neutrons or resultant secondary gamma rays reaching the measurement means has been considered as indicative of the presence of gas in a porous stratum.

However, it is known that a low porosity water or oil-containing sand can result in a measurement which is the same or comparable to that of a relatively high porosity gas sand. Furthermore, considerable invasion of the porous permeable formations by water from the drilling fluid usually occurs, and such invasion of a gas sand results in an apparent increase in the amount of hydrogen per unit volume of the invaded portion thereof. The effect of such invasion is to depress the measurements as conventionally made, to an extent comparable to that which would result from a water or oil-containing sand of the same or slightly greater density and reduced porosity.

For the foregoing reasons it has heretofore been of doubtful practicability by radiological means, heretofore employed, to distinguish a drilling fluid invaded gas sand from a water or oil-containing sand in an earth borehole. In fact, it has not heretofore been possible by such methods to distinguish between relatively high porosity formations containing low hydrogen fluids and relatively low porosity formations containing high hydrogen fluids.

It is, therefore, an important object of this invention to provide a radiological method for borehole testing by means of which relatively high porosity formations containing low hydrogen-containing fluid can be distinguished from relatively low porosity formations containing high hydrogen-containing fluid.

It is a principal object of this invention to provide a method and apparatus for identifying and locating within an earth borehole, gas-containing strata traversed thereby.

It is a further object of this invention to provide a radiological method of distinguishing between gas sands and other strata within an earth borehole.

It is a still further object of this invention to distinguish between strata containing fluids having a low hydrogen content as compared to strata containing fluids having high hydrogen content such as water or oil.

It has been discovered that the effect of the invasion of permeable formations by the liquid portion of the borehole fluid, such as the drilling fluid, can be taken advantage of and utilized in connection with radiological well surveying to make it possible to discriminate between gas-containing formations and water or oil-containing formations.

It has been found that if the formations surrounding the borehole are bombarded by neutrons from a suitable source and the effect of such bombardment is measured by a radiation measurement means located a relatively short distance axially of the borehole from such source, the measurement thus obtained will be mostly influenced by the formation contents within a surrounding zone relatively close to the borehole. It has also been found that if the effect of such bombardment is measured by a radiation measurement means located a relatively greater distance axially of the borehole from such source, the measurement thus obtained will be influenced correspondingly more by the formation contents within a surrounding zone extending relatively farther outward from the borehole.

Therefore, if a measurement is made by the radiation measurement means located sufficiently close to the source axially of the borehole, such measurement will be influenced mostly by the liquid which is caused to invade the formations closely surrounding the borehole, while a measurement similarly made by radiation measurement means located substantially farther from the source will be influenced to a greater extent by the connate fluid contents of the formation outlying beyond the invaded zone.

Therefore, whether or not the invaded formation in question, into which water from the borehole liquid has been caused to invade, contains either water or gas beyond the invaded zone, the measurement of the relatively close spaced measurement means would be substantially or nearly the same in either case. However, if the invaded formation in question contains either water or gas beyond the invaded zone, the measurement of the relatively more distantly spaced measurement means would be substantially less or greater, dependent upon whether such contents were water or gas, respectively.

Thus, two physical parameters of such formation may be obtained which may be compared with one another or subtracted from one another, and if found to differ, such difference may be taken as indicative of the presence in the formation beyond the invasion zone, of gas or other fluid having a low, or at least different, hydrogen content per unit volume thereof relative to that of the invasion fluid. An important step in the system of this invention and not heretofore recognized or utilized thus resides in causing and utilizing the effect of invasion of fluid to a varying degree or limited distance laterally into the formation surrounding the borehole.

Accordingly, the invention in its broadest aspects, by means of which the objects are attained, resides in a radiological system for obtaining information relative to the character of the fluid contained in formations traversed by earth boreholes comprising, in brief, causing the invasion of the borehole permeable formations with fluid of known or predetermined composition, particularly as to its hydrogen content per unit volume, bombarding the thus invaded formations and laterally adjacent uninvaded formations with neutrons from a source moved through the borehole, and making measurements correlated with borehole depth, of the resulting radiation intercepted by the borehole at two or more locations, each at different, substantially fixed spacings from such source, and comparing such measurements.

These and other objects and features of novelty will be evident hereinafter.

In the accompanying drawing wherein a preferred embodiment and the best mode contemplated by the inventor for carrying out his invention is illustrated:

Figure 1 is a longitudinal view of the general arrangement of the apparatus, partially in longitudinal section and partially schematic, in logging position within a typical earth borehole.

Figure 2 is a graphical representation of the measurements obtained by the apparatus of Figure 1, correlated with the measured borehole strata of Figure 1.

Figure 3 is a schematic diagram of an alternative arrangement of certain of the apparatus of Figure 1.

Figure 4 is a view partially in elevation and partly in longitudinal section of a modified form of radiation detector employable in the apparatus of Figure 1.

Referring mainly to Figure 1 of the drawing, the down-the-hole apparatus comprises a cylindrical instrument housing 10 adapted to be sealed fluid-tight and enclose the necessary measuring apparatus to be lowered into a fluid-filled earth borehole B. The instrument housing 10 is suspended and adapted to be raised and lowered in the well borehole by means of a conductor cable 11 of conventional design which contains a suitable number of insulated conductors and thereby also serves to convey the electrical measuring signals from the measuring apparatus in the housing 10 to the surface of the earth.

Within the instrument housing 10 are a pair of concentrically positioned, axially spaced-apart radiation detector means 12 and 13 which may be any of several known types, preferably of the Geiger counter, scintillation detector or ionization chamber types capable of detecting and responding to gamma radiation or to slow neutrons as hereinafter more fully described. For convenience of illustration, in Figure 1 the radiation detectors are shown as ionization chambers. These ionization chambers may each be of substantially conventional construction, comprising, in general, an external, metal, pressure-resistant chamber 14 which serves as an external electrode, and a centrally positioned rod 15 which serves as a central electrode. The central electrode 15 enters the chamber 14 and is supported and insulated therefrom by a suitable pressure-resistant lead-in insulator or bushing as shown at 16. The chambers are supported within the housing 10 by means of suitable insulators as shown at 19. The ionization chambers 14 are filled with suitable inert gas such as, for example, argon, under a pressure in the order of from 1,500 to 2,000 p.s.i.

Outside the ionization chambers 12 and 13 but within the instrument housing 10 are suitable electrical potential supply means for the ionization chambers. Each such supply means may comprise a battery 20 and a resistor 21 connected in series between the central electrode 15 and the outer electrode 14.

Preferably the negative pole of the battery is connected to the outside electrode 14 and the positive pole connected to the central electrode 15 of the ionization chambers. The battery 20 may have a potential difference of approximately 140 volts and the resistor 21 a resistance of approximately $10^{12}$ ohms. Across the resistors 21 of the ionization chambers 12 and 13 are connected suitable amplifiers $A_1$ and $A_2$ through conductors 22, 23 and 24, 25, respectively. The outputs of the amplifiers $A_1$ and $A_2$ are connected through conductors 28 and 29, respectively, to suitable ones of the before-mentioned conductors within the conductor cable 11.

At the surface, exterior of the borehole, the cable 11 passes over a measuring pulley 30 and is wound onto a cable drum 31 driven by suitable means not shown. The before-mentioned insulated conductors within cable 11 are connected at the upper end terminal of the cable to a pair of slip rings 32 and 33 carried on the cable drum shaft. Connection is made from the slip rings 32 and 33 through brushes 36 and 37 and conductors 38 and 39 to surface amplifiers $A_3$ and $A_4$, respectively. Return connections completing the circuit between the amplifiers $A_1$ and $A_2$ within the instrument housing 10 and the surface amplifiers $A_3$ and $A_4$ are provided by way of a common ground connection 41 within the instrument housing 10 and ground connections 42 and 43 at the surface.

Electrical connections are made from the outputs of the amplifiers $A_3$ and $A_4$ by way of conductor pairs 45 and 46, respectively, to meter means 48 and 49 of recording apparatus 50. The recording apparatus 50 comprises a movable record strip or chart 51 which passes from roller 52 to roller 53, the movements of such rollers and the chart being accomplished by any suitable means such as through a mechanical drive coupling comprising a shaft 54 and gear reduction unit 55 interconnecting the recorder roller 53 and the shaft of the measuring pulley 30. The movement of the chart 51 is thus correlated with the movement and depth of the instrument housing 10 within the earth borehole. While mechanical coupling means between the measuring wheel 30 and the recorder 50 is here illustrated, other suitable means may be employed, such as, for example, an electrical transmission system between the measuring pulley 30 and the drive mechanism of the recorder 50, of the type known as the "Selsyn" transmission system.

The meter means 48 and 49 are provided with suitable pens 57 and 58, respectively, which bear upon the moving chart 51 and produce thereon graphical records, as shown at 59 and 60, as the chart moves, as before-mentioned, in correlation with the position of the instrument housing 10 within the earth borehole. Such graphical records 59 and 60 represent simultaneous recordings of the measurements made by the ionization chambers 12 and 13, respectively, as will be hereinafter more fully described.

Within the lower end portion of the instrument housing 10 and spaced axially a suitable distance below the ionization chambers is a neutron source 65. This neutron source may be any one of the well known types capable of producing a relatively strong neutron radiation field such as, for example, mesothorium 2 or a mixture of radium and beryllium, capable of producing an intense emission of neutrons. Above the neutron source 65 is positioned a relatively thick body 66 of dense material, such as lead, to act as a shield to reduce as much as possible gamma radiations, if any, directly produced by the neutron source 65, from reaching the ionization chambers 12 and 13. Another shielding body 67, of metal such as lead, may be placed under the neutron source 65 and this body 67 together with that at 66 substantially surrounds it and thereby serves to substantially prevent gamma radiations from the source from reaching the surrounding formations of the borehole, and thereby minimizes or substantially prevents any resulting scattered gamma rays from reaching the ionization chambers 12 and 13, from the source, by indirect paths through the surrounding formations.

For convenience of illustration the borehole is shown as having penetrated an overlying shale formation 70, an upper intermediate permeable gas sand 71, a lower intermediate permeable oil or water sand 72 and an underlying shale formation 78. The drilling fluid invasion in the shale bodies will ordinarily be extremely shallow, if any, and the lateral distance of such invasion is shown by way of illustration with some exaggeration at 74 and 79. In the gas sand 71 which is relatively permeable, the lateral distance of invasion of the drilling fluid is relatively greater as illustrated at 75, and in the oil or water sand 72 the lateral distance of invasion of the drilling fluid is illustrated at 76. The two formations 71 and 72 being assumed to be of about the same permeability, porosity and pressure and to have been drilled into at about the same time, these latter two distances of invasion would be and are shown as substantially equal. The underlying body of shale illustrated at 78 has a relatively shallow drilling fluid invasion line 79 as hereinbefore mentioned in connection with the shale body 70.

For convenience of illustration the fluid invasion boundary lines have been illustrated in somewhat idealized regularity. Actually the invasion boundary line is known to be in most cases quite irregular and laterally fingered in form. The effect of this is that the fluid invasion varies in amount laterally of the borehole, but whether or not such variation is abrupt as illustrated or is gradual is not of primary importance so long as such variation occurs and is reasonably close to the borehole walls. This can be controlled in a desirable manner by employing a drilling fluid from which fluid infiltration into the formations will be a minimum or if fluid is subsequently injected into the borehole, by controlling the pressure and time of application.

The operation of the apparatus of the invention is as follows: First, preferably, although not necessarily, the gain of the instrument amplifiers $A_1$ and $A_2$ or the gain of the surface amplifiers $A_3$ and $A_4$ or both, are adjusted so as to produce substantially equal lateral deflections of the recorder pens 57 and 58 if the instrument housing 10 containing the before-described apparatus therein, were lowered and positioned within a well borehole opposite a substantially homogeneous formation of substantial thickness relative to the spacings between the neutron source 65 and the radiation detectors 12 and 13, such homogeneous formation being preferably one such as shown at 72 wherein the formation beyond the interface 76 of the drilling fluid invasion zone contains water, or oil having approximately the same hydrogen atom content per unit volume as the invasion liquid from the borehole fluid, which is usually water when conventional aqueous drilling fluids are employed. Having made the before-mentioned adjustment, if desired, the instrument housing 10 containing the radiation detectors 12 and 13 and the neutron source 65 and other apparatus as hereinbefore described, is lowered by means of the conductor cable 11 into the well borehole past the penetrated formations to be investigated.

As the instrument is moved through the borehole the high velocity neutrons from the source 65 penetrate the surrounding formations in all directions substantially uniformly. These neutrons, by reason of their passage through the surrounding formations and liquid contents thereof, are reduced in velocity or thermalized and eventually are captured by certain of the elements making up the surrounding formations, thereby giving rise to secondary gamma rays which are in turn radiated more or less uniformly in all directions, a certain proportion of which are intercepted by the borehole and the ionization chambers 12 and 13 contained in the housing 10 therein. By reason of the before-described adjustment of the relative gains of the several amplifiers, when the ionization chambers 12 and 13 are positioned opposite the homogeneous formation, such as the shale bodies 70 and 78, or such as the oil or water sands 72, the response of the radiation detectors 12 and 13 due to the before-mentioned secondary gamma rays, will be such as to produce in both cases nearly equal lateral deflections of the pens 57 and 58 of the recorder 50. However, whenever instrument housing 10 is so positioned as to bring the radiation detectors 12 and 13 and the source 65 adjacent a borehole-liquid-invaded, permeable, gas-containing formation such as that shown at 71, the proportion of the secondary gamma rays received by the upper ionization chamber 12 increases as compared to that received by the lower radiation detector 13 for the reason hereinbefore explained. Thus, wherever a permeable formation lying outside the drilling fluid invaded zone contains a relatively low hydrogen content fluid such as methane, ethane or other light fluids or mixtures thereof, the velocity attenuation and capture rate of neutrons from the source 65 and moving in the region beyond the invaded zone but intermediate the neutron source and the detector 13 is lower, and hence a greater number of neutrons is able to reach the more distant region of the formation adjacent the more distant radiation detector 12 before being captured. As a consequence of this, the slow neutron radiation field intensity opposite and adjacent the more distant detector 12 rises while at the same time the slow neutron field intensity opposite and adjacent the nearer detector 13 rises to a much less extent and may even decrease. Thus, the proportion of the resultant secondary gamma rays resulting from such capture and able to reach the detector 12 as compared to those able to reach the detector 13, is correspondingly changed, resulting in an increase in the response of the ionization chamber 12 relative to ionization chamber 13. This in turn results in a corresponding change in the relative deflections of the recorder pens 57 and 58 of the recorder 50 which in turn results in a difference in amplitude of the curves 59 and 60 relative to one another.

When the instrument housing 10 containing the before-described apparatus including the radiation detectors 12 and 13 is positioned opposite a permeable formation containing connate oil or water, such as that shown at 72, the before-described unbalance in the degree of response of detectors 12 and 13 does not take place. The reason for this is that the ability of water and of oil of the composition most usually encountered in oil wells, to reduce the velocity of neutrons is substantially equal to that of the invasion liquid, since the hydrogen content per unit volume of such oil and water is of the same order. Therefore, the number of thermal velocity neutrons which may succeed in reaching the portion of the formation lying opposite the upper radiation detector 12 is not thereby changed and is not as great as that possible where the formation beyond the drilling fluid invaded zone contains a relatively low hydrogen content fluid such as gas or other relatively low hydrogen containing hydrocarbon liquids, and since the response of the detectors 12 and 13 was adjusted, as hereinbefore described, to give equal deflections of the pens 57 and 58 of the recorder 50 under such conditions as that illustrated by formation 72, the amplitude of the curves plotted on the chart 51 under such conditions will be substantially equal.

From the foregoing it will become evident that as the instrument housing 10 is moved through the well borehole, the amplitude of the curves 59 and 60 will vary to some extent from formation to formation, but will remain substantially equal to one another as the instrument passes all formations which contain fluids having substantially the same hydrogen content per unit volume thereof or that of the invasion fluid, and in the case where the invasion fluid is water, such condition will obtain for formations which do not contain gas or other low hydrogen content fluid. However, when the apparatus moves past a fluid invaded formation such as that shown at 71 containing connate fluid having a substantially different hydrogen content per unit volume from that of the invasion fluid, for example where the invasion fluid is water and the formation contains gas or other low hydrogen content fluid, the prior balance in response of the detectors 12 and 13 is then disturbed and the amplitudes of the curves 59 and 60 then change relative to one another. Thus, when, for example the invasion fluid is water, such change of amplitude of the curves 59 and 60 relative to one another, thus becomes an indication of the presence of a permeable, porous formation containing gas or other low hydrogen content fluid.

The lengths of the pens 57 and 58 of the recorder 50 may be different as shown, or the meter means 48 and 49 thereof may be offset with respect to one another in a direction parallel to the direction of travel of the chart 51 in order to compensate for the effective axial spacing in housing 10 between the radiation detectors 12 and 13, such that both curves 59 and 60 may be accurately correlated with one another on the chart 51 and together effectively correlated in position with depths of borehole formations opposite the respective ionization chambers. If these two curves 59 and 60 are drawn by a suitable recorder, capable of superimposing the curves, or if the curves as made by recorder 50 are transposed into superposition with respect to one another by other means, they will have an appearance and position relative to one another such as that illustrated in Figure 2 at 59a and 60a, respectively, whereby the difference in magnitude or amplitude of such curves may be readily obtained or observed. Thus, as illustrated in Figure 2, and by reason of the adjustment hereinbefore described, it is evident that the two curves 59a and 60a will be made substantially coincident, as shown at 80 and 81 when the instrument is opposite shale formations such as shown at 70 and 78, or opposite oil or water containing formations such as shown at 72. However, when the instrument is moved past a gas containing, permeable formation into which aqueous liquid from the drilling fluid has invaded, such as shown at 71, the relative amplitude or deflection of the curves changes to produce a difference or departure between them as illustrated at 83.

The amount of such difference or departure between the amplitude of the curves 59a and 60a as illustrated at 83 for a given formation will vary with the amount and depth of invasion of the invasion fluid into the formation, which in turn will depend upon the character of the borehole fluid and upon pressure, porosity and permeability of the formation in question. However, the indication of primary importance is the existence or nonexistence of such a substantial departure whether or not of high or low magnitude, such departure being indicative of a permeable formation containing a fluid which has a different hydrogen content per unit of volume as compared to that of the invaded liquid from the borehole fluid.

While the present invention has been illustrated as being accomplished, preferably by means of a down-the-hole instrument containing a pair of fixed, spaced-apart radiation detecting or measuring devices such as the ionization chambers 12 and 13 associated with apparatus capable of making two secondary or induced gamma ray logs simultaneously, the object of the invention may also be accomplished in a less facile manner by means of an instrument containing a single neutron source and a single radiation detecting or measuring device such as, for example, a single gamma ray detector or measuring means axially spaced apart from one another, together with a suitable single transmission and recording system. By making two separate runs with such an instrument through the borehole, with the spacing between the source and the detector different for the two runs, and with both such runs correlated with depth in the borehole the resulting logs thus separately made may be correlated with one another in the same manner as hereinbefore described. Departure in the resultant curves, thus correlated, will be indicative of the position of the gas-containing or other fluid-containing formation in the same manner as that hereinbefore described.

Suitable spacings between the neutron source as shown at 65 and the radiation detectors 12 and 13 have been found to be in the order of approximately 15" and 24", respectively, and the same difference in spacings between neutron source and radiation detectors may be employed in the separate runs of the before-mentioned instrument containing a single source and single detector. Considerable variation from these dimensions and spacings may be employed, but in general, the sensitivity of the system increases with increased spacing between the ionization chambers up to certain limits, while at the same time the resolving power thereof becomes less. The before-mentioned dimensions represent a suitable compromise between these two varying conditions.

Other operatively equivalent arrangements of the neutron source and radiation detectors relative to one another within the instrument housing are obviously possible. For example, the arrangement shown in Figure 1 may be inverted, thereby placing the neutron source above the upper radiation detector instead of below the lower radiation detector. Also, the neutron source may be placed between the upper and lower radiation detectors as illustrated in Figure 3, the only requirement being that the same or comparable differences in distance be maintained between the neutron source and each of the radiation detectors, and that corresponding modifications be provided in the recording apparatus to correlate the recorded measurements with respect to borehole depth. An arrangement inverse to that illustrated in Figure 3 may obviously also be employed.

While ionization chambers have been illustrated and described and referred to herein in connection with the apparatus of this invention for detecting, sensing or measuring the intensity of the gamma radiation, other suitable types of gamma ray responsive devices for measuring such radiation intensities such as the Geiger counter or the scintillation counter or detector may obviously be employed, together with suitable transmission systems adapted to such types of radiation detectors. The type of transmission system employed for producing the signal currents at the recorder, such as shown at 50 in Figure 1, in response to and indicative of the gamma rays detected or measured by the gamma ray detectors 12 and 13 within the borehole instrument forms no part of this invention per se, since any suitable and well known type of transmission system may be employed. For example, transmission systems for each of the radiation detectors of the ionization chamber type, such as that disclosed in the patent to Fearon, No. 2,361,389, may be employed to advantage under some circumstances.

While gamma ray detectors or measurement devices are preferably employed at 12 and 13 in the borehole instrument for detection and measurement of the secondary or induced gamma ray field intensity or energy resulting from the bombardment of the surrounding formations with neutrons in the manner hereinbefore described, the invention is not limited entirely to such construction and operation, but may also employ neutron detectors at such locations in the borehole instrument for detecting and measuring the neutron radiation intensity at such locations, preferably the thermal neutron radiation, which gives rise to the secondary or induced gamma ray radiations in the same vicinity as hereinbefore described. The thermal neutron field intensity in the formation surrounding the borehole in the vicinity of the detectors 12 and 13 have values which are substantially proportional to the secondary or induced gamma ray radiation intensity at these locations and resulting therefrom, and hence the number of thermal neutrons intercepted by the borehole at the positions of the detectors 12 and 13 will be substantially proportional to the gamma ray field intensity at such same locations.

For the purpose of measuring the neutron field intensity at such locations the radiation detectors 12 and 13 may be of any suitable type sensitive preferably to slow neutrons such as, for example, proportional counters containing boron tri-fluoride ($BF_3$) gas and constructed in a manner well known in the art. In order to confine the measurements at 12 and 13 substantially to those of slow neutrons, and to exclude as much as possible the effect of gamma rays, such counters or detectors are preferably covered or surrounded by a shield of dense material such as lead, in the manner shown for device 12a at 85 in Figure 4. Such proportional counters employing boron tri-fluoride gas may also be made relatively insensitive to gamma rays of relatively low energy, such as those emitted by the source of natural emissions from the formations, by suitable electronic means well known in the art. If such shielding or electronic means is omitted from the counters or ionization chambers, which are otherwise responsive to neutrons, these devices will be responsive to both the slow neutrons and the secondary gamma rays and the measurements made thereby will combine both effects with similar results.

It is to be understood that the foregoing disclosure and description is illustrative only of the best mode contemplated for accomplishing the invention, and that the invention is not limited thereby, but includes all modifications thereof within the scope and definition of the appended claims.

What is claimed is:

1. A method of determining the location and nature of the connate fluid content of underground formations traversed by a borehole and into which formations adjacent the borehole extraneous fluid has been caused to invade, comprising: passing through said borehole after such invasion, a source of neutrons from which neutrons pass outwardly into such formations surrounding said borehole; making a measure of the intensity of radiation from said formations resulting from said neutrons and intercepting such borehole at a first predetermined, substantially axial spacing from said source as said source is moved longitudinally through said borehole; making a measure of the intensity of radiation of the same nature as said first mentioned radiation from said formations resulting from said neutrons and intercepting such borehole at a second predetermined substantially axial spacing from said source as said source is moved longitudinally through said borehole, said first and second spacings being different; and graphically indicating one of said measured intensities relative to the other of said measured intensities in correlation with the depths in said borehole at which they were made thereby indicating lateral variations of fluid content of said formations.

2. A method of determining the location and nature of the fluid content of underground formations traversed by a borehole and into which formations adjacent the borehole extraneous fluid has been caused to invade, comprising: passing through said borehole after such invasion, a source of neutrons from which neutrons pass outwardly into such formations surrounding said borehole; simultaneously, separately making separate measurements of the intensity of radiation of the same nature from said formations resulting from said neutrons and intercepting said borehole at different, fixed distances axially of the borehole from the said source as said source is moved longitudinally through said borehole; and making a measure of lateral variations of fluid content of said formations by graphically indicating one of said measured intensities relative to another of said measured intensities in correlation with the depths in said borehole at which they were made.

3. The method as claimed in claim 2 wherein the method is performed in a borehole in which the extraneous fluid is liquid and the formations contain gas and measurement is made of lateral variations of liquid content in the gas-containing formations.

References Cited in the file of this patent

UNITED STATES PATENTS

| | | |
|---|---|---|
| 2,508,772 | Portecorvo | May 23, 1950 |
| 2,544,412 | Bird | Mar. 6, 1951 |
| 2,652,496 | Herzog | Sept. 15, 1953 |
| 2,667,583 | Herzog | Jan. 26, 1954 |
| 2,670,442 | Herzog | Feb. 23, 1954 |
| 2,725,486 | Walstrom | Nov. 29, 1955 |